United States Patent
Baba et al.

(10) Patent No.: US 8,300,101 B2
(45) Date of Patent: Oct. 30, 2012

(54) IMAGE PROCESSING METHOD, IMAGE PROCESSING SYSTEM, IMAGE PICKUP DEVICE, IMAGE PROCESSING DEVICE AND COMPUTER PROGRAM FOR MANIPULATING A PLURALITY OF IMAGES

(75) Inventors: Kozo Baba, Oita (JP); Hisao Ito, Oita (JP); Akiyoshi Tafuku, Oita (JP); Tomonobu Takashima, Kawasaki (JP); Masatoshi Tohno, Kawasaki (JP); Taku Katagiri, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 512 days.

(21) Appl. No.: 11/889,990

(22) Filed: Aug. 17, 2007

(65) Prior Publication Data
US 2007/0291140 A1    Dec. 20, 2007

Related U.S. Application Data

(63) Continuation of application No. PCT/JP2005/002467, filed on Feb. 17, 2005.

(51) Int. Cl.
H04N 5/225    (2006.01)
H04N 5/262    (2006.01)
H04N 7/14    (2006.01)

(52) U.S. Cl. .................... 348/169; 348/240.2; 348/14.1; 348/14.15

(58) Field of Classification Search ............. 348/240.99, 348/14.01–14.16, 169–172
See application file for complete search history.

(56) References Cited

U.S. PATENT DOCUMENTS

| 6,297,846 | B1 * | 10/2001 | Edanami | 348/239 |
| 6,593,956 | B1 * | 7/2003 | Potts et al. | 348/14.09 |
| 6,993,158 | B2 * | 1/2006 | Cho et al. | 382/103 |
| 7,636,454 | B2 * | 12/2009 | Lee et al. | 382/103 |
| 8,004,565 | B2 * | 8/2011 | Herz | 348/169 |
| 2002/0054032 | A1 * | 5/2002 | Aoki et al. | 345/204 |
| 2004/0228505 | A1 | 11/2004 | Sugimoto | |

(Continued)

FOREIGN PATENT DOCUMENTS

JP    7-296299    11/1995

(Continued)

OTHER PUBLICATIONS

Japanese Office Action mailed Oct. 20, 2009 and issued in corresponding Japanese Patent Application 2007-503530.

(Continued)

*Primary Examiner* — Aung S Moe
*Assistant Examiner* — Chia-Wei A Chen
(74) *Attorney, Agent, or Firm* — Staas & Halsey LLP (57) ABSTRACT

A system using an in-vehicle camera mounted on a vehicle for an image pickup object of the face of the driver, for: continuously taking an image of the image pickup object; performing manipulation, such as enlargement of an area including the image pickup object with a reference point being the center, for a second image based on image pickup after a first image, on the basis of the range of the image pickup object detected from the first image, the width of the facial contour of the driver, for example, and also a reference point such as the center of the face to be decided based on the location of the eyes and nose of the driver; and performing image processing, such as detection of the range of the image pickup object and decision of the reference point, for the manipulated second image.

6 Claims, 10 Drawing Sheets

U.S. PATENT DOCUMENTS

2005/0238209 A1* 10/2005 Ikeda et al. .................. 382/118
2006/0077258 A1* 4/2006 Allen et al. .................. 348/169

FOREIGN PATENT DOCUMENTS

| | | |
|---|---|---|
| JP | 11-250267 | 9/1999 |
| JP | 2000-163564 | 6/2000 |
| JP | 2003-219396 | 7/2003 |
| JP | 2003-248815 | 9/2003 |
| JP | 2004-104530 | 4/2004 |
| JP | 2004-234367 | 8/2004 |
| JP | 2004-234494 | 8/2004 |
| JP | 2004-303150 | 10/2004 |
| JP | 2004-318331 | 11/2004 |
| JP | 2005-79683 | 3/2005 |
| WO | WO2006/087790 * | 8/2006 |

OTHER PUBLICATIONS

International Search Report of International Published Application No. PCT/JP2005/002467 (mailed Apr. 26, 2005).

Japanese Office Action mailed Mar. 30, 2010 and issued in corresponding Japanese Patent Application No. 2007-503530.

* cited by examiner

FIG. 10

IMAGE PROCESSING METHOD, IMAGE PROCESSING SYSTEM, IMAGE PICKUP DEVICE, IMAGE PROCESSING DEVICE AND COMPUTER PROGRAM FOR MANIPULATING A PLURALITY OF IMAGES This application is a continuation of PCT International Application No. PCT/JP2005/002467 which has an International filing date of Feb. 17, 2005, which designated the United States of America.

BACKGROUND

1. Technical Field

The present invention relates to an image processing method for continuously taking an image of an image pickup object and detecting the range of the image pickup object in an image based on image pickup; an image processing system to which the image processing method is applied; an image pickup device and an image processing device which are used in the image processing system; and a computer program for realizing the image processing device, and in particular to an image processing method, an image processing system, an image pickup device, an image processing device and a computer program for facilitating a process such as detection of a range.

2. Description of the Related Art

Suggested as a device to support driving of a vehicle such as a car is an image processing device for taking an image of the face of the driver with an in-vehicle camera, which is arranged at a location capable of taking an image of the face of the driver, and performing image processing to detect the facial contour of the driver, the location of the eyes and nose and also the status of the face based thereon from an obtained image (see Japanese Patent Application Laid-Open No. 2004-234367, for example). Moreover, constructed using such a device is a system for detecting the status of the driver and providing driving support such as warning to inattentive driving.

However, when the face of the driver is away from the in-vehicle camera, for example, there is a problem that the part of the face in the taken image becomes small and image processing such as detection of the contour and the location of the eyes and nose cannot be performed sufficiently.

SUMMARY

The present invention has been made in view of such circumstances, and it is an object thereof to provide: an image processing method for performing manipulation such as enlargement for a second image, which is taken after a first image, on the basis of the range of the facial contour or the like detected for the first image in continuously taking an image of an image pickup object such as the face of the driver and detecting the range of the image pickup object in the manipulated second image so as to facilitate image processing such as detection of a range related to an image object; an image processing system to which the image processing method is applied; an image pickup device and an image processing device which are used in the image processing system; and a computer program for realizing the image processing device.

An image processing method according to the first aspect is an image processing method for continuously taking an image of an image pickup object and detecting a range of the image pickup object in an image based on image pickup, characterized by comprising the steps of: manipulating a second image after a first image on the basis of a range of the image pickup object detected from the first image; and detecting a range of the image pickup object in the manipulated second image.

An image processing system according to the second aspect is an image processing system comprising image pickup means for continuously taking an image of an image pickup object and image processing means for detecting a range of the image pickup object in an image based on image pickup of the image pickup means, characterized by comprising: manipulating means for manipulating a second image after a first image on the basis of a range of the image pickup object detected from the first image; and means for detecting a range of the image pickup object in the manipulated second image.

An image processing system according to the third aspect is the one according to the second aspect, characterized in that the manipulating means is constructed to enlarge the second image.

An image processing system according to the fourth aspect is the one according to the third aspect, characterized in that the manipulating means is constructed to decide an enlargement ratio on the basis of a size of a range.

An image processing system according to the fifth aspect is the one according to the third aspect or the fourth aspect, characterized by further comprising means for deciding a reference point of manipulation in the image pickup object, wherein the manipulating means is constructed to enlarge an image with the reference point being a center.

An image processing system according to the sixth aspect is the one according to the fifth aspect, characterized in that the image pickup object is a face, the range of the image pickup object is a range of the face in a predetermined direction, and the reference point in the image pickup object is a point obtained based on location of eyes and/or a nose.

An image pickup device according to the seventh aspect is an image pickup device, which comprises means for continuously taking an image of an image pickup object and is connected with an image processing device for detecting a range of the image pickup object in an image based on image pickup, characterized by comprising: means for accepting input of range data, which indicates a range of the image pickup object detected from a first image, from the image processing device; means for manipulating a second image after the first image on the basis of the range indicated by the accepted range data; and means for outputting image data, which indicates the manipulated second image, to the image processing device.

An image processing device according to the eighth aspect is an image processing device for continuously accepting input of image data indicative of an image and detecting a range of an image pickup object in an image based on the accepted image data, characterized by comprising: means for manipulating second image data after first image data on the basis of a range of the image pickup object detected from an image based on the first image data; and means for detecting a range of the image pickup object in an image based on the manipulated second image data.

A computer program according to the ninth aspect is a computer program for causing a computer, which comprises means for continuously accepting input of image data indicative of an image, to detect a range of an image pickup object in an image based on the accepted image data, characterized by running: a procedure of causing a computer to manipulate second image data after first image data on the basis of a range of the image pickup object detected from an image based on the first image data; and a procedure of causing a computer to detect a range of the image pickup object in an image based on the manipulated second image data.

With the first aspect, the second aspect, the seventh aspect, the eighth aspect and the ninth aspect which are, for example, applied to a system using an in-vehicle camera mounted on a vehicle for an image pickup object of the face of the driver and properly manipulate a second image on the basis of the processing result for a first image, it is possible to facilitate image processing, such as detection of a range related to an image object, for the second image. Especially, when being applied to the image pickup device shown in the seventh aspect wherein an image is preliminarily manipulated as pretreatment and outputted to the image processing device so that the image pickup object is shown in the image in a standard state, it is possible to reduce the processing load on the image processing device and to use the image pickup device in a plurality of types of image processing software in common, so that it is possible to reduce memory for recording image data. Moreover, with the eighth aspect and the ninth aspect, it is possible to realize image processing of the present invention using a conventional image pickup device.

With the third aspect wherein an image is also enlarged when, for example, the face of the driver which is the image pickup object is small, image processing such as detection of a range related to the image object is facilitated.

With the fourth aspect wherein an enlargement ratio is properly decided, it is possible to adjust the size of the image pickup object to a size suitable for image processing.

With the fifth aspect, it is possible to adjust the image pickup object to location which facilitates image processing even when the image pickup object moves in a taken image.

The sixth aspect can be applied to detection of the facial contour of the driver who drives a vehicle, the location of the eyes and nose and also the status of the face based thereon.

An image processing method, an image processing system, an image pickup device, an image processing device and a computer program according to the present invention are applied, for example, to a system using an in-vehicle camera mounted on a vehicle for an image pickup object of the face of the driver so as to: continuously take an image of the image pickup object; perform manipulation, such as enlargement of an area including the image pickup object with a reference point being the center, for a second image based on image pickup after a first image on the basis of the range of the image pickup object detected from the first image, the width of the facial contour of the driver, for example, and also a reference point such as the center of the face to be decided based on the location of the eyes and nose of the driver; and perform image processing, such as detection of the range of the image pickup object and decision of the reference point, for the manipulated second image.

With this structure, since an image pickup object in an image can be enlarged when the same is small and the location can be adjusted, beneficial effects can be guaranteed such as facilitation of image processing such as detection of the range of the image pickup object and decision of a reference point.

Especially, when being applied to an image pickup device such as an in-vehicle camera, since the processing load on an image processing device connected with the image pickup device can be reduced and the image pickup device can be used in a plurality of types of image processing software in common by preliminarily manipulating an image as pretreatment and outputting the image to the image processing device so that the image pickup object is shown in the image in a standard state, beneficial effects can be guaranteed such as reduction of memory for recording image data.

DESCRIPTION OF THE NUMERALS

1 Image Pickup Device
2 Image Processing Device
3 Computer Program
4 Memory Product

DETAILED DESCRIPTION OF THE EMBODIMENTS

The following description will explain the present invention in detail with reference to the drawings illustrating some embodiments thereof.

Embodiment 1

Figure 1:
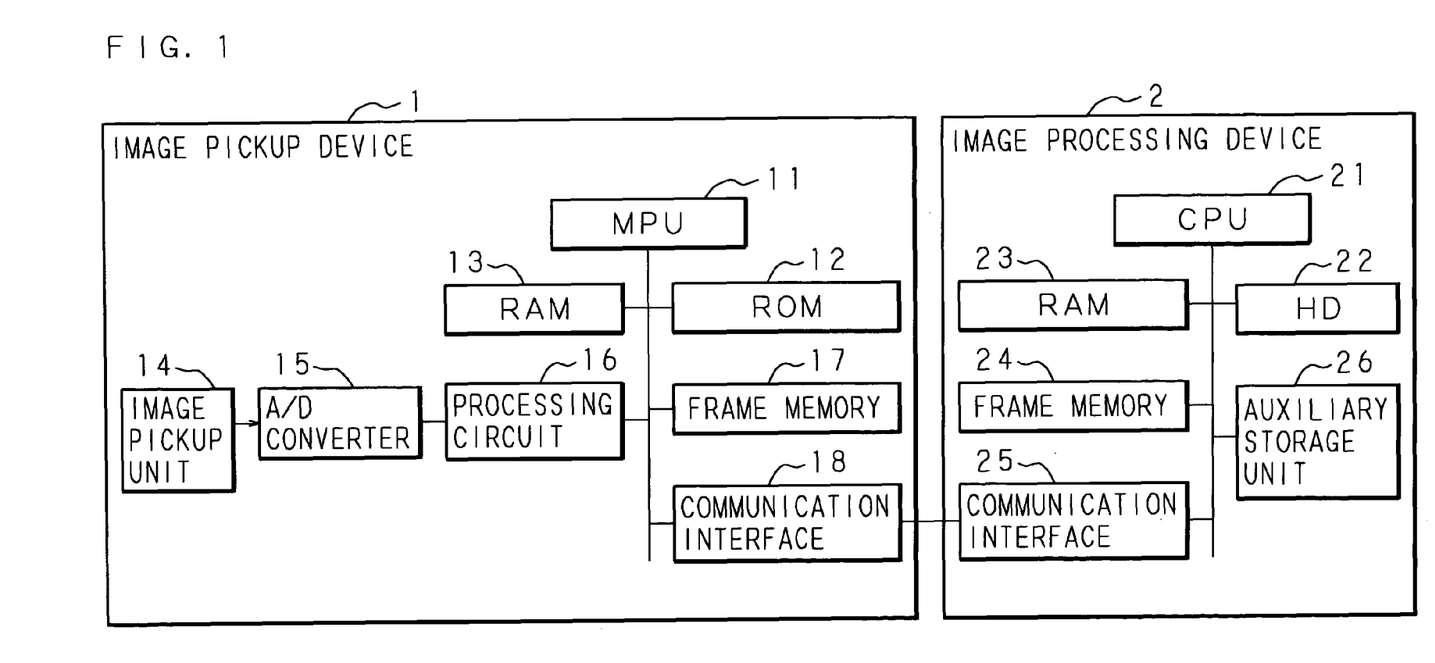
FIG. 1 is a block diagram showing the structure of an image processing system according to Embodiment 1 of the present invention.

FIG. 1 is a block diagram showing the structure of an image processing system according to Embodiment 1 of the present invention. Denoted at 1 in FIG. 1 is an image pickup device such as an in-vehicle camera mounted on an vehicle, which is connected with an image processing device 2 for performing image processing via a communication network such as an in-vehicle LAN (Local Area Network) having a wired or wireless structure, or a communication line such as a dedicated cable. The image pickup device 1 is disposed in front of the driver, e.g. at the handle or the dashboard in a vehicle, and adjusted to be able to take an image of the face of the driver as an image pickup object.

The image pickup device 1 comprises: an MPU (Micro Processor Unit) 11 for controlling the entire device; a ROM (Read Only Memory) 12 for recording data and various kinds of computer programs to be executed based on control of the MPU 11; a RAM (Random Access Memory) 13 for storing various kinds of data to be generated temporally during execution of a computer program recorded in the ROM 12; an image pickup unit 14 constituted of an image pickup element such as a CCD (Charge Coupled Device); an A/D converter 15 for converting analog image data obtained by image pickup of the image pickup unit 14 into digital data; a processing circuit 16 for performing image processing, which will be explained later, for digital image data converted by the A/D converter 15; a frame memory 17 for temporally storing image data processed by the processing circuit 16; and a communication interface 18 to be used for communication with the image processing device 2.

In the image pickup device 1, the image pickup unit 14 performs an image pickup process continuously or intermittently so as to generate 30 image data (image frames) per second, for example, on the basis of an image pickup process and output the same to the A/D converter 15, and the A/D converter 15 converts each pixel constituting image data into digital image data which is shown by a gradation such as 256 gradation (1 Byte). The image data processed by the processing circuit 16 is then stored in the frame memory 17 and the stored image data is outputted to the image processing device 2 at predetermined timing. Moreover, the image pickup device 1 accepts various kinds of data necessary for a process of the processing circuit 16 from the image processing device 2 at predetermined timing and the accepted data is recorded in a memory such as a flash memory provided in the processing circuit 16. It should be noted that various kinds of data such as a reference value necessary for image processing to be performed by the processing circuit 16 is preliminarily recorded in the memory.

The image processing device 2 comprises: a CPU (Central Processing Unit) 21 for controlling the entire device; a hard disk (which will be hereinafter referred to as an HD) 22 for recording data and various kinds of computer programs to be executed based on control of the CPU 21; a RAM 23 for storing various kinds of data to be generated temporarily during execution of a computer program recorded in the HD 22; a frame memory 24 constituted of, for example, a non-volatile storage; a communication interface 25 to be used for communication with the image pickup device 1; and an auxiliary storage unit 26 for accessing a record medium such as a CD-ROM or a memory card.

In the image processing device 2, image data outputted from the image pickup device 1 is accepted at the communication interface 25 and a computer program recorded in the HD 22 is executed for the accepted image data, so that a variety of image processing is performed and various kinds of data based on the result of image processing is outputted from the communication interface 25 to the image pickup device 1. Image processing based on execution of a computer program recorded in the HD 22 is a variety of processes such as: detection of the facial contour of the driver, which is the image pickup object, from image data; identification of the location of the eyes and nose; and also detection of the orientation of the face based on the result thereof. A concrete example of a process is a process of detecting the location of the eyes by pattern matching. Another example of a process is a process of integrating the brightness on a vertical line of an image and comparing the integrated value with a predetermined threshold so as to detect the horizontal range of the facial contour composed of pixels having higher brightness than background. Furthermore, another example is a process of differentiating a horizontal change in the integrated value in the above process to identify the location having a large change and detecting a boundary between background and the facial contour where the brightness greatly changes. The detailed content of the processes is described in documents such as Japanese Patent Application Laid-Open Nos. 2000-163564, 2004-234494 and 2004-234367 which have been applied by the present applicant. It should be noted that the above image processing is not always limited to the processes described in Japanese Patent Application Laid-Open Nos. 2000-163564, 2004-234494 and 2004-234367, and can be selected properly according to the terms such as the use thereof, the hardware structure or cooperation with other application programs.

Figure 2:
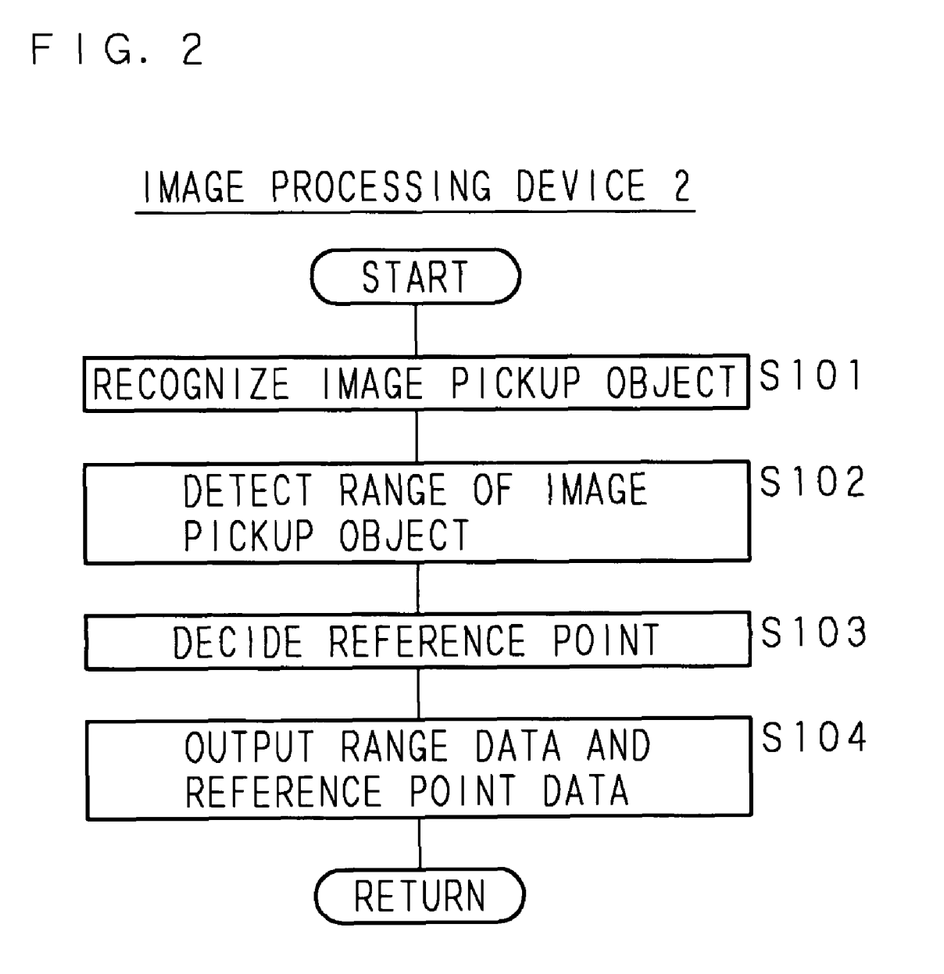
FIG. 2 is a flow chart showing an image recognition process of an image processing device to be used in an image processing system according to Embodiment 1 of the present invention.

The following description will explain various kinds of processes to be performed in an image processing system in Embodiment 1 of the present invention. FIG. 2 is a flow chart showing an image recognition process of the image processing device 2 to be used in an image processing system according to Embodiment 1 of the present invention. The image processing device 2 performs a recognition process of an image pickup object, which is image processing including detection of the facial contour of the driver that is the image pickup object from image data and identification of the location of the eyes and nose, under control of the CPU 21 (S101) and supports driving on the basis of the result of the recognition process of the image pickup object. The image processing device 2 further detects the range of the image pickup object On the basis of the result of the recognition process under control of the CPU 21 (S102), decides a reference point in the image pickup object (S103) and outputs range data indicative of the detected range and reference point data indicative of the decided reference point from the communication interface 25 to the image pickup device 1 (S104). The recognition process of the image pickup object in the step S101 is performed using various kinds of processes described in documents such as Japanese Patent Application Laid-Open Nos. 2000-163564, 2004-234494 and 2004-234367 as described above, for example. It should be noted that the image data to be used for the recognition process of the image pickup object to be performed in the step S101 is image data obtained by performing a manipulation process with conversion of a coordinate system for image data obtained by image pickup and A/D conversion in a process of the image pickup device 1 which will be explained later and, therefore, a conversion process for restoring the coordinate system to the original one is performed for a driving supporting process to be performed based on the result of the recognition process. Here, the necessity of the conversion to restore the coordinate system of the range data and the reference point data outputted in the step S104 to the original one can be set arbitrarily. When conversion of the range data and the reference point data is not performed by the image processing device 2, conversion of the coordinate system is performed by the image pickup device 1.

Figure 3:
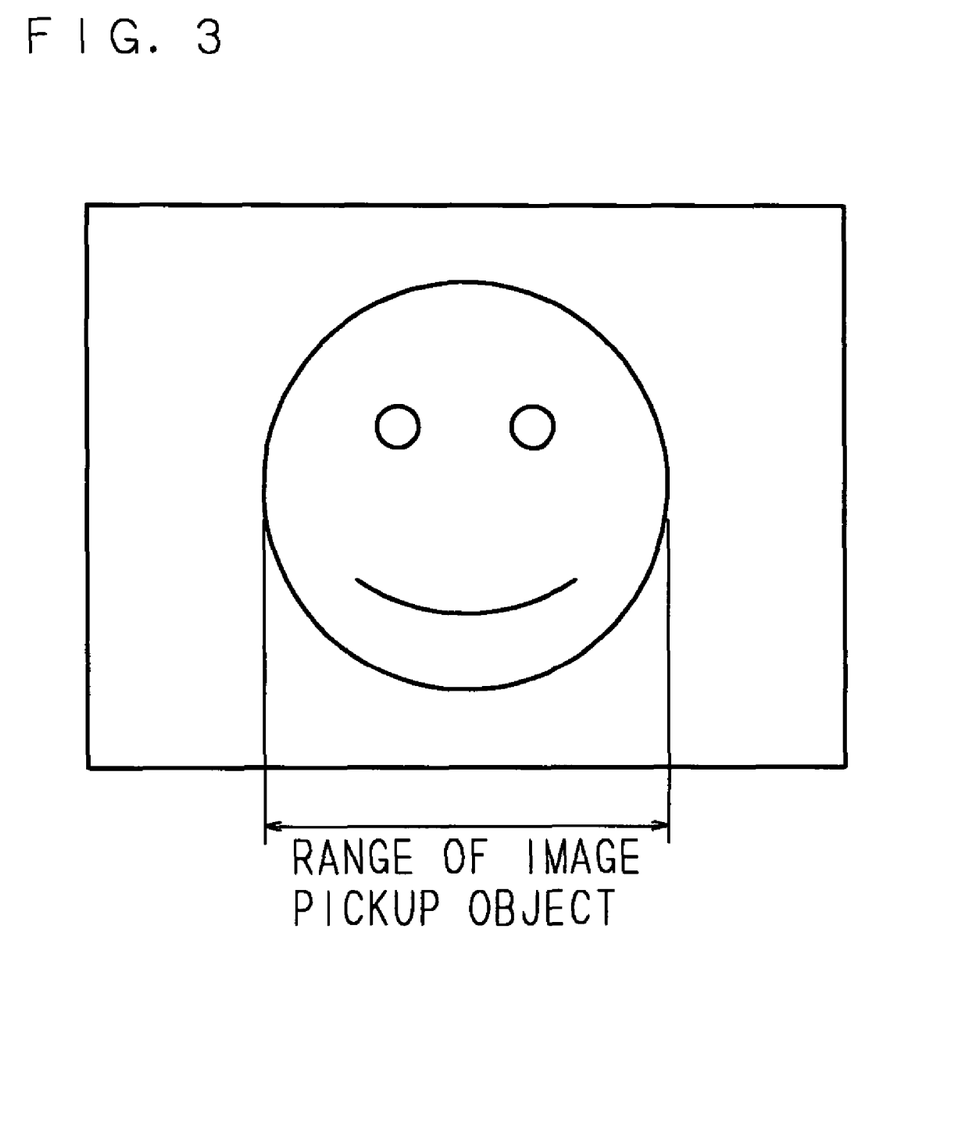
FIG. 3 is an explanatory view conceptually showing a process of an image processing device to be used in an image processing system according to Embodiment 1 of the present invention.

FIG. 3 is an explanatory view conceptually showing a process of the image processing device 2 to be used in an image processing system according to Embodiment 1 of the present invention. FIG. 3 conceptually shows detection of the range of the image pickup object in the step S102 in the image recognition process of the image processing device 2 explained using FIG. 2. The rectangular frame shown in full line in FIG. 3 is the entire image based on image data wherein the face of the driver which is the image pickup object is shown and the range shown by both arrows is the range of the image pickup object. The process of detecting the range of the image pickup object in the step S102 is a process of detecting the width of the face of the driver in the right-and-left direction (horizontal direction) on the basis of the facial contour of the driver which is the image pickup object detected in the step S101.

Figure 4:
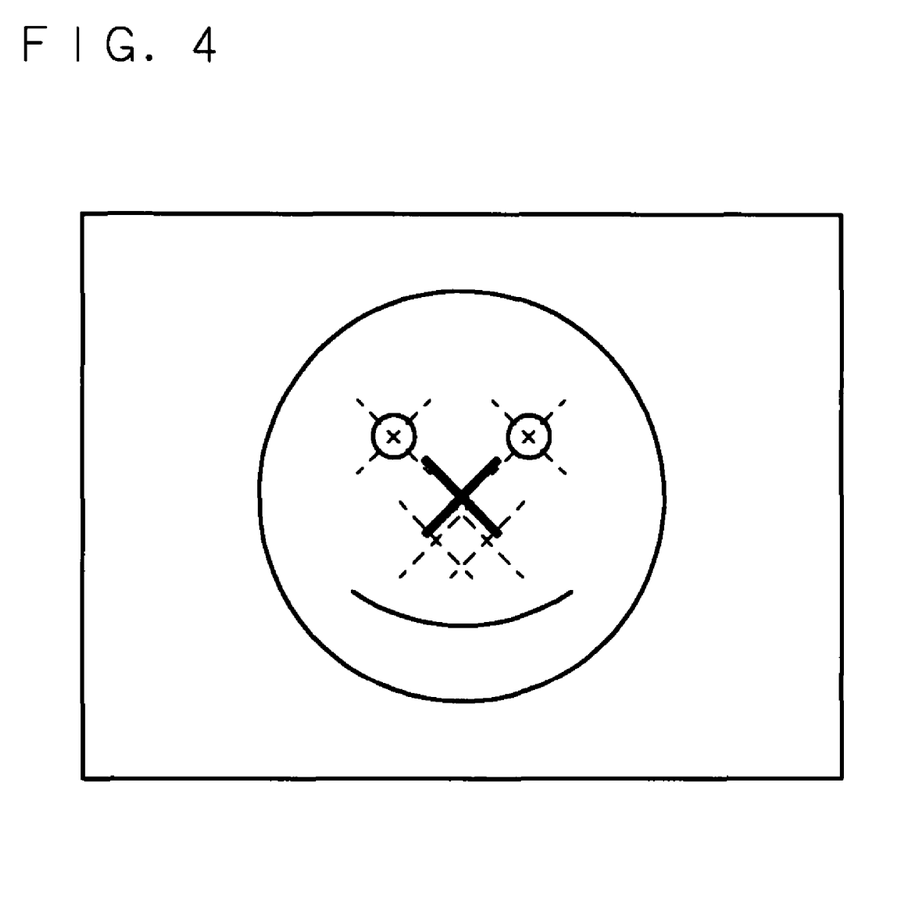
FIG. 4 is an explanatory view conceptually showing a process of an image processing device to be used in an image processing system according to Embodiment 1 of the present invention.

FIG. 4 is an explanatory view conceptually showing a process of the image processing device 2 to be used in an image processing system according to Embodiment 1 of the present invention. FIG. 4 conceptually shows decision of a reference point of an image pickup object of the step S103 in the image recognition process of the image processing device 2 explained using FIG. 2. As shown in FIG. 4, decision of a reference point in an image pickup object in the step S103 is a process of deciding the center of the face as a reference point to be the reference for manipulation, on the basis of the location of the eyes and nose identified in the face of the driver which is an image pickup object detected in the step S1 01 and, in particular, a process of computing coordinates of the center of gravity shown by the x-mark in full line from coordinates of four points of both eyes and both nasal cavities shown by the x-marks in dash line in FIG. 4 and deciding the computed center of gravity as a reference point which is the center of the face.

Figure 5:
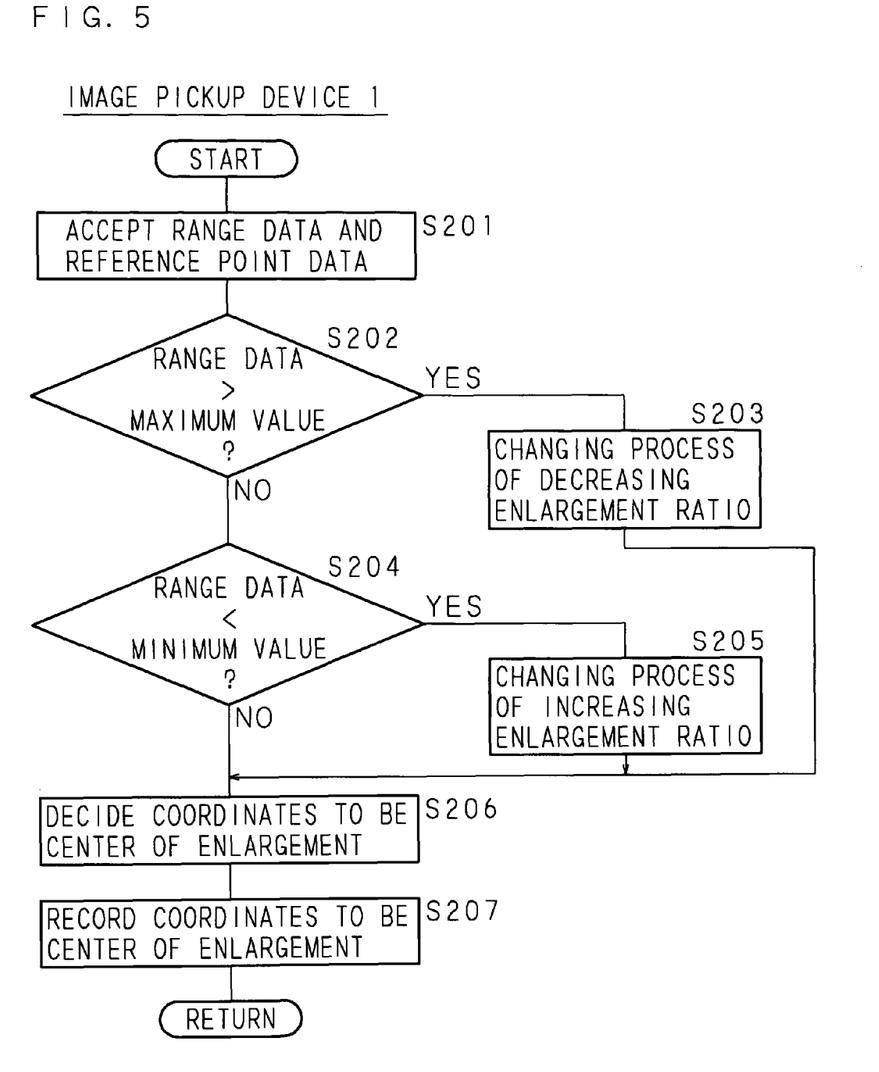
FIG. 5 is a flow chart showing a data recording process for image manipulation of an image pickup device to be used in an image processing system according to Embodiment 1 of the present invention.

FIG. 5 is a flow chart showing a data recording process for image manipulation of the image pickup device 1 to be used in an image processing system according to Embodiment 1 of the present invention. In the image pickup device 1, input of range data and reference point data outputted from the image processing device 2 is accepted at the communication interface 18 under control of the MPU 11 (S201) and the accepted range data is compared with the maximum value of range data which is preliminarily recorded in the memory of the processing circuit 16 as a reference value (S202).

When it is determined in the step S202 that the accepted range data is larger than the maximum value of range data (S202: YES), the image pickup device 1 performs an enlargement ratio changing process of decreasing a numerical value indicative of an enlargement ratio recorded in the memory of the processing circuit 16, under control of the MPU 11 (S203). A numerical value indicative of an enlargement ratio is a numerical value indicative of a scaling factor for enlargement of image data as manipulation of the image data, and a numerical value recorded in the memory of the processing circuit 16 is a numerical value which has been used for previous enlargement of image data. That is, whether enlargement is to be performed using the previous enlargement ratio or not is determined in the enlargement ratio changing process in the step S203. It should be noted that, when an enlargement ratio is to be changed, the ratio between the accepted range data and a reference value recorded preliminarily is computed and a changed enlargement ratio is computed based on the computed ratio. It should be noted that, when a plurality of enlargement ratios classified into several grades are to be recorded preliminarily to change an enlargement ratio, an enlargement ratio may be changed by causing transition of the grade of an enlargement ratio by a predetermined grades.

When it is determined in the step S202 that the accepted range data is smaller than or equal to the maximum value of range data (S202: NO), the image pickup device 1 compares the accepted range data with the minimum value of range data, which is preliminarily recorded in the memory of the processing circuit 16 as a reference value, under control of the MPU 11 (S204).

Figure 6:
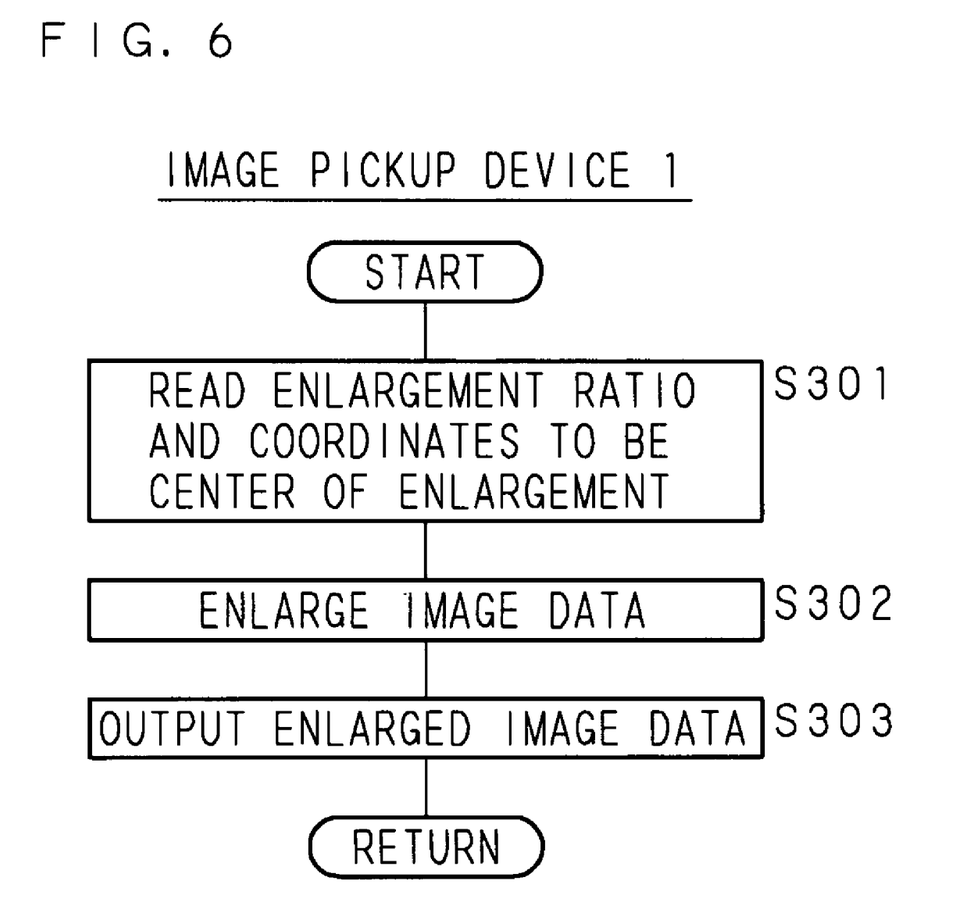
FIG. 6 is a flow chart showing an image data manipulating process of an image pickup device to be used in an image processing system according to Embodiment 1 of the present invention.

When it is determined in the step S204 that the accepted range data is smaller than the minimum value of range data (S204: YES), the image pickup device 1 performs an enlargement ratio changing process of increasing a numerical value indicative of an enlargement ratio recorded in the memory of the processing circuit 16, under control of the MPU 11 (S205). That is, an enlargement ratio is FIG. 6 is a flow chart showing an image data manipulating process of the image pickup device 1 to be used in an image processing system according to Embodiment 1 of the present invention. In the image pickup device 1, image data, which is obtained by converting an image taken by the image pickup unit 14 into digital data with the A/D converter 15, is accepted at the processing circuit 16 on the basis of control of the MPU 11, and the processing circuit 16 reads a numerical value indicative of an enlargement ratio recorded in the memory and coordinates to be the center of enlargement (S301) and performs a manipulation process of enlarging the accepted image data in an enlargement ratio indicated by the read numerical value, with the read coordinates being the center (S302). The range of image data to be enlarged is decided from the enlargement ratio and the center of enlargement. It should be noted that an interpolation process of pixels composing image data is performed for enlargement of image data. Moreover, the coordinate system is converted with enlargement of image data. The image pickup device 1 then stores the enlarged image data in the frame memory 17 under control of the MPU 11 and outputs the enlarged image data stored in the frame memory 17 from the communication interface 18 to the image processing device 2 at predetermined timing (S303). It should be noted that, when the image processing device 2 is to perform a process related to conversion of the coordinate system of image data, data necessary for conversion of the coordinate system is also outputted from the image pickup device 1 to the image processing device 2.

Figure 7:
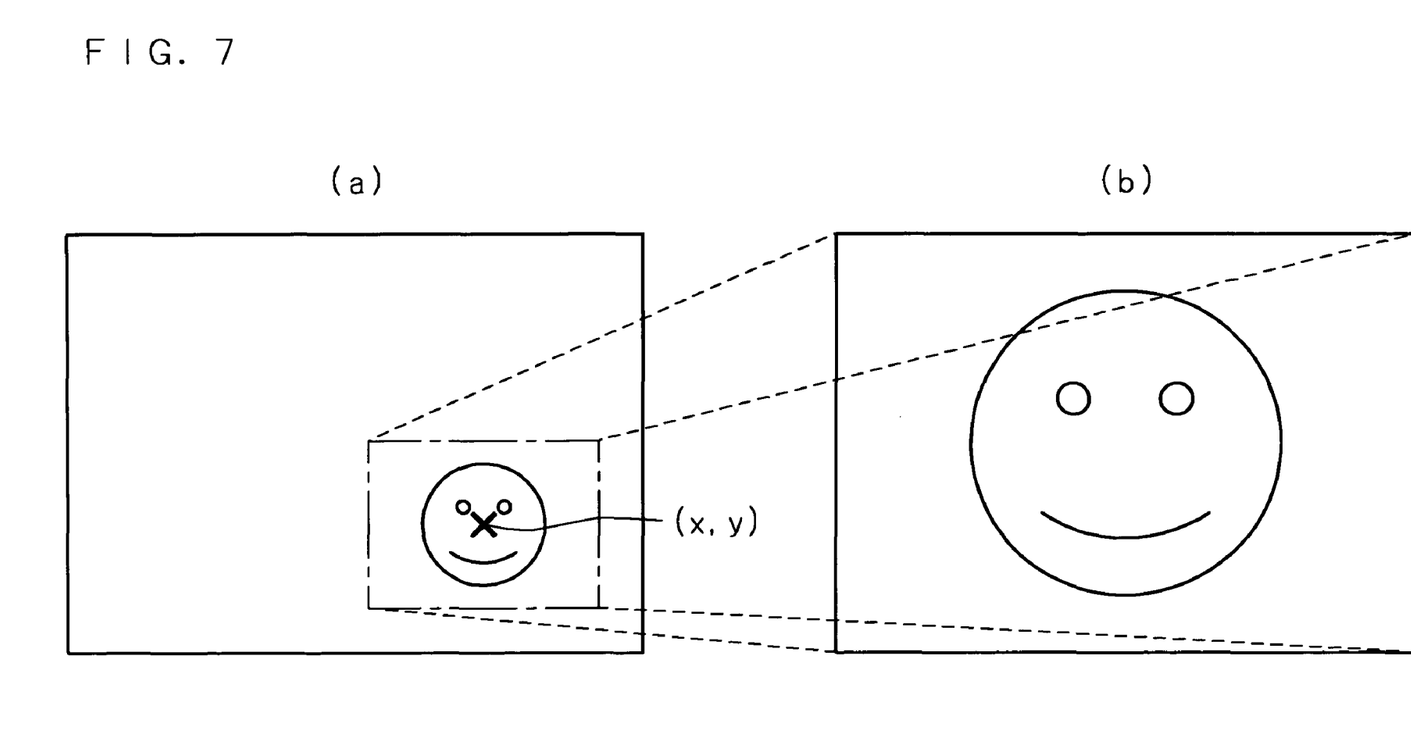
FIG. 7 is an explanatory view conceptually showing a process of an image pickup device to be used in an image processing system according to Embodiment 1 of the present invention.

FIG. 7 is an explanatory view conceptually showing a process of the image pickup device 1 to be used in an image processing system according to decided based on the size of the range indicated by the range data in the processes of the steps S202-S205. It should be noted that an enlargement ratio may be changed based on accepted range data every time range data is accepted, without comparing the range data with the maximum value and the minimum value. It should be noted that, when the image processing device 2 does not convert the coordinate system for accepted range data, a conversion process is performed before comparison of the step S202.

After an enlargement ratio changing process is performed in the step S203 or the step S205, or when it is determined in the step S204 that the accepted range data is larger than or equal to the minimum value of range data (S204: NO), the image pickup device 1 decides coordinates to be the center of enlargement on the basis of the reference point data accepted in the step S201 under control of the MPU 11 (S206) and records the decided coordinates to be the center of enlargement into the memory of the processing circuit 16 (S207). In the step S206, the reference point data is decided as coordinates to be the center of enlargement. Here, when the image processing device 2 does not convert the coordinate system for the accepted reference point data, the coordinates after the conversion of the coordinate system of the reference point data is decided as coordinates to be the center of enlargement. Moreover, for decision of coordinates to be the center of enlargement, whether the said coordinates is within the effective range of an enlarged image or not is also determined based on an enlargement ratio recorded in the memory.

Embodiment 1 of the present invention. FIG. 7 conceptually shows the manipulation process of the step S302 in the image data manipulating process of the image pickup device 1 explained using FIG. 6. The frame shown in full line in FIG.

7(a) shows an image based on image data before a manipulation process obtained by image pickup and a manipulation process is performed for an image in the frame shown in long dashed short dashed line in FIG. 7(a). Moreover, the frame shown in full line in FIG. 7(b) shows an image based on image data after a manipulation process. The manipulation process shown in FIG. 7 is an enlargement process of an image, and a part of the image of FIG. 7(a) is enlarged based on an enlargement ratio read from the memory, with coordinates (x, y) to be the center of enlargement shown in the image shown in FIG. 7(a) being the center. It should be noted that the image of a part to be enlarged is an image within the range decided from the enlargement ratio and the center of enlargement.

The image processing device 2 then accepts input of enlarged image data after the manipulation process at the communication interface 25 and performs an image recognition process shown using FIG. 2, such as recognition of an image pickup object, detection of the range of the image pickup object and decision of a reference point, for the accepted image data. As described above, in the image processing system of the present invention, manipulation such as enlargement of an area including an image pickup object with a reference point being the center is performed for a second image based on image pickup after a first image on the basis of the range of the image pickup object detected from the first image and a decided reference point, and image processing such as detection of the range of the image pickup object and decision of a reference point is performed for the manipulated second image.

Embodiment 2

Figure 8:
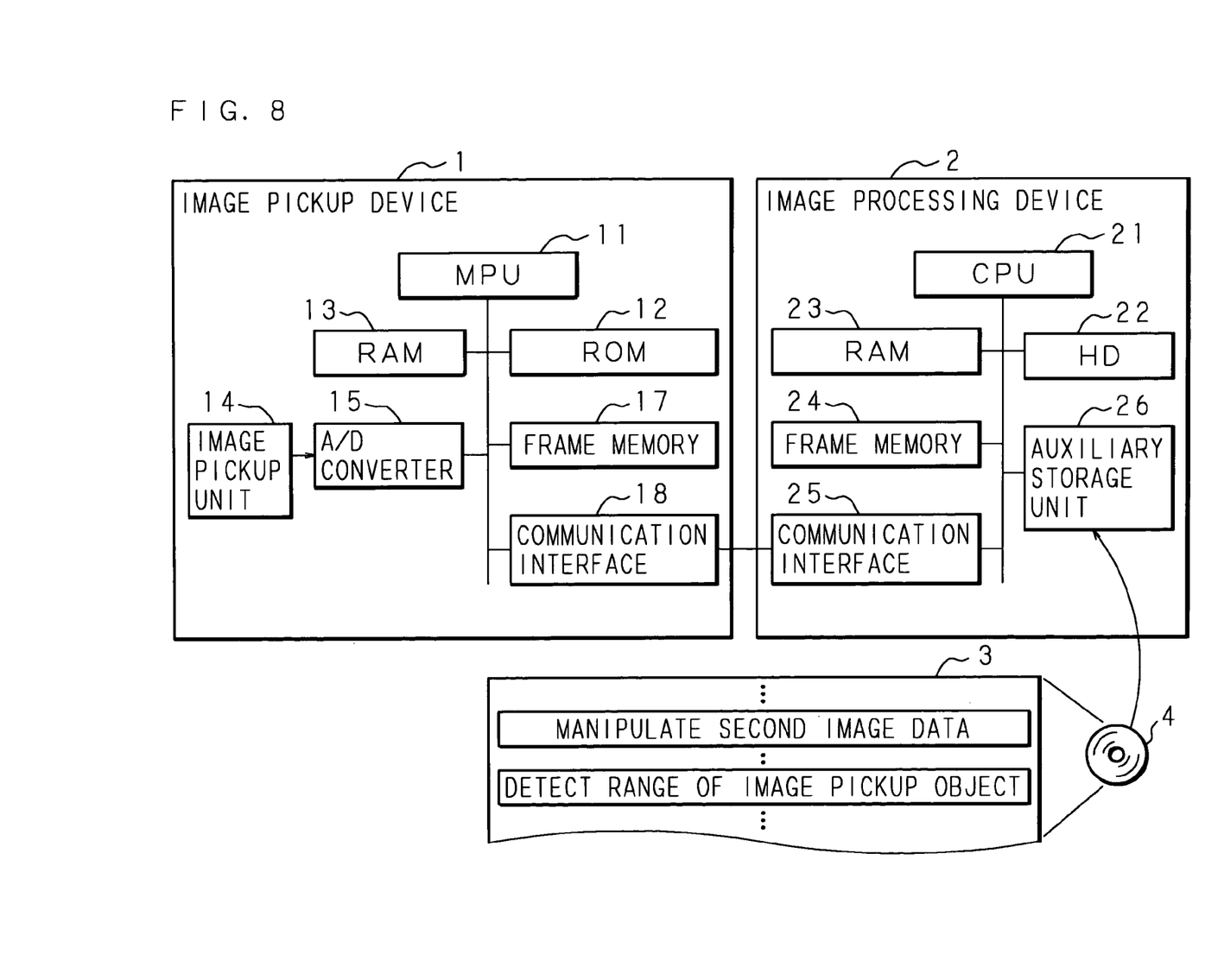
FIG. 8 is a block diagram showing the structure of an image processing system according to Embodiment 2 of the present invention.

Embodiment 2 is an embodiment of performing a manipulation process of image data in Embodiment 1 at the image processing device 2. FIG. 8 is a block diagram showing the structure of an image processing system according to Embodiment 2 of the present invention. It should be noted that the same numerals as Embodiment 1 are used to refer to the same elements as Embodiment 1 and explanation thereof will be omitted. Since the manipulation process of image data is performed at the image processing device 2 in Embodiment 2, the image processing device 1 does not comprise the processing circuit 16. The image processing device 2 reads various kinds of information from a memory product 4, which records various kinds of information such as data and a computer program 3 of the present invention, with the auxiliary storage unit 26, records various kinds of read information in the HD 22 and causes the RAM 23 to store various kinds of information recorded in the HD 22 for execution under control of the CPU 21. It should be noted that data such as a reference value necessary for image processing is recorded in the HD 22 for execution of the computer program 3 of the present invention.

Figure 9:
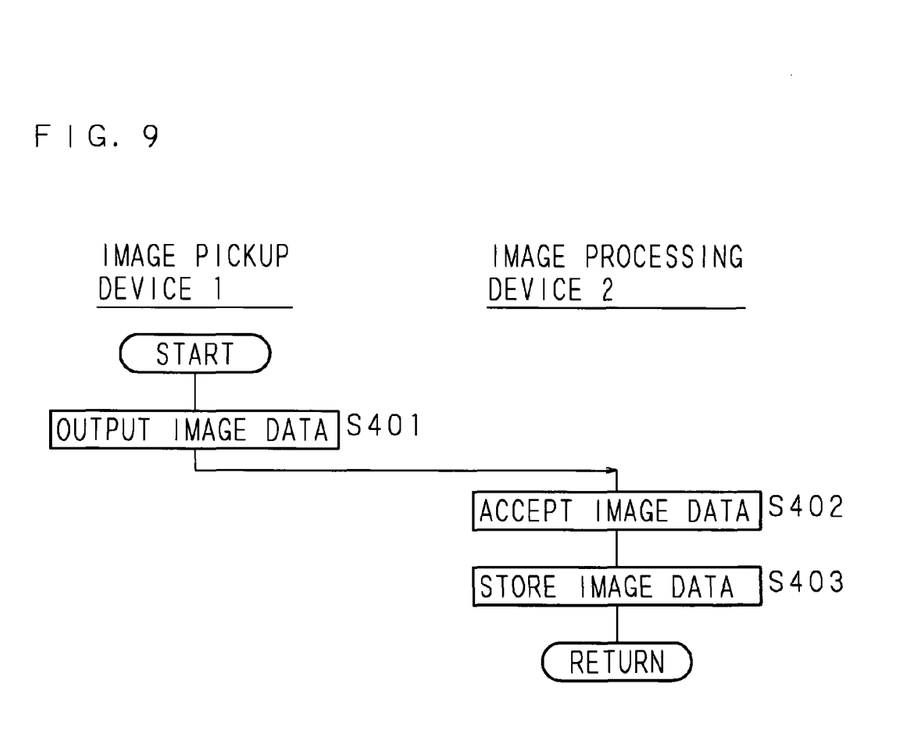
FIG. 9 is a flow chart showing an image data acquisition process of an image pickup device and an image processing device to be used in an image processing system according to Embodiment 2 of the present invention.

FIG. 9 is a flow chart showing an image data acquisition process of the image pickup device 1 and the image processing device 2 to be used in an image processing system according to Embodiment 2 of the present invention. The image pickup device 1 stores image data, which is obtained by converting an image taken by the image pickup unit 14 into digital data with the A/D converter 15, in the frame memory 17 under control of the MPU 11 and outputs the image data stored in the frame memory 17 from the communication interface 18 to the image processing device 2 at predetermined timing (S401).

The image processing device 2 accepts the image data outputted from the image pickup device 1 at the communication interface 25 under control of the CPU 21 (S402) and stores the accepted image data in the frame memory 24 (S403).

Figure 10:
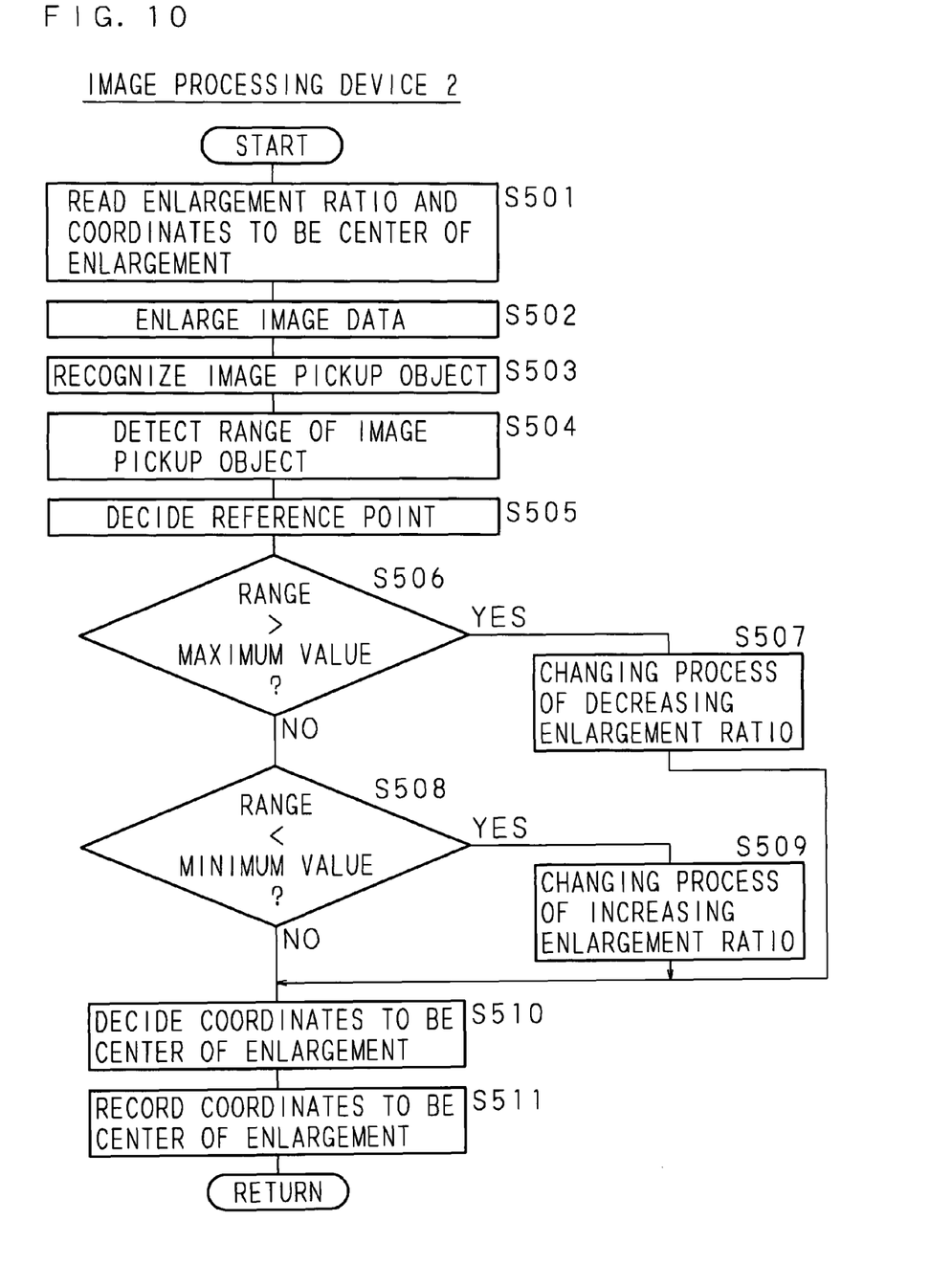
FIG. 10 is a flow chart showing image processing of an image processing device to be used in an image processing system according to Embodiment 2 of the present invention.

FIG. 10 is a flow chart showing image processing of the image processing device 2 to be used in an image processing system according to Embodiment 2 of the present invention. The image processing device 2 reads a numerical value indicative of an enlargement ratio and coordinates to be the center of enlargement, which are recorded in the HD 22 or the RAM 23, under control of the CPU 21 (S501) and performs a manipulation process of enlarging image data stored in the frame memory 24 with the read coordinates being the center, in an enlargement ratio indicated by the read numerical value (S502).

The image processing device 2 then performs a recognition process of an image pickup object, which is image processing including detection of the facial contour of the driver that is the image pickup object from enlarged image data and identification of the location of the eyes and nose, under control of the CPU 21 (S503) and supports driving on the basis of the result of the recognition process of the image pickup object. The image processing device 2 further detects the range of the image pickup object on the basis of the result of the recognition process under control of the CPU 21 (S504) and then decides a reference point in the image pickup object (S505).

The image processing device 2 then compares the range of the image pickup object detected in the step S504 with the maximum value of the range of the image pickup object, which is preliminarily recorded in the HD 22 as a reference value, under control of the CPU 21 (S506).

When it is determined in the step S506 that the detected range of the image pickup object is larger than the recorded maximum value of the range (S506: YES), the image processing device 2 performs an enlargement ratio changing process of decreasing a numerical value indicative of an enlargement ratio, which is recorded in the HD 22 or the RAM 23; under control of the CPU 21 (S507).

When it is determined in the step S506 that the detected range of the image pickup object is smaller than or equal to the recorded maximum value of the range (S506: NO), the image processing device 2 compares the range of the image pickup object detected in the step S504 with the minimum value of the range of the image pickup object, which is preliminarily recorded in the HD 22 as a reference value, under control of the CPU 21 (S508).

When it is determined in the step S508 that the detected range of the image pickup object is smaller than the recorded minimum value of the range (S508: YES), the image processing device 2 performs an enlargement ratio changing process of increasing a numerical value indicative of an enlargement ratio, which is recorded in the HD 22 or the RAM 23, under control of the CPU 21 (S509).

After performing an enlargement ratio changing process in the step S507 or the step S509, or when it is determined in the step S508 that the detected range of the image pickup object is larger than or equal to the recorded minimum value of the range (S508: NO), the image processing device 2 decides coordinates to be the center of enlargement on the basis of the reference point decided in the step S505, under control of the CPU 21 (S510) and records the decided coordinates to be the center of enlargement into the HD 22 or the RAM 23 (S511). An enlargement ratio and coordinates to be the center of enlargement which are recorded in the HD 22 or the RAM 23 when the processes to the step S511 are executed are used for a manipulation process of enlarging the next image data.

As explained in Embodiments 1 and 2 in detail, the present invention repeatedly performs a process of: continuously taking an image of an image pickup object; manipulating a second image obtained by image pickup after a first image on the basis of an enlargement ratio and coordinates to be the center of enlargement decided based on the first image; performing a variety of image processing based on the manipulated second image; and also deciding an enlargement ratio and coordinates to be the center of enlargement of the next image.

Though a process of enlarging an image is shown in the above Embodiments 1 and 2 as a process for manipulating an image, the present invention is not limited to this and a variety of processes such as reduction, conversion of gradation or a differentiation process can be used. Moreover, though an embodiment of enlarging image data is shown as an enlargement process, an embodiment of enlarging the range of image pickup optically can be also employed.

Though an embodiment for an image pickup object of the driver of a vehicle is shown in the above Embodiments 1 and 2, the present invention is not limited to this and an embodiment for an image pickup object of a variety of human, or even a living matter other than human or a nonliving matter can be also employed.

What is claimed is:

1. An image processing method, comprising:
    obtaining a plurality of images by taking continuously an image of a face;
    detecting a first range of the face in a first image among the plurality of images;
    deciding a first reference point that is located in the detected first range, the first reference point being a center of gravity for the range;
    calculating a first scaling rate based on the first range and the first reference point;
    performing a first scaling operation on a second image, which is obtained after the first image, with the calculated first scaling rate and with the first reference point being a center for the first scaling operation;
    identifying a second range of the face in the second image on which the first scaling operation has been performed;
    deciding a second reference point that is located in the second range, the second reference point being a center of gravity for the second range;
    calculating a second scaling rate based on the second range and the second reference point; and
    performing a second scaling operation on a third image, which is obtained after the second image, with the calculated second scaling rate and with the second reference point being a center for the second scaling operation.

2. An image processing system, comprising
    an image pickup part that obtains a plurality of images by continuously taking an image of a face;
    an image processing part that detects a first range of the face in a first image among the plurality of images;
    a deciding part that decides a first reference point that is located in the detected first range, the first reference point being a center of gravity for the range;
    a first calculating part that calculates a first scaling rate based on the first range and the first reference point;
    a first scaling part that performs a first scaling operation on a second image, which is obtained after the first image, with the calculated first scaling rate and with the first reference point being a center for the first scaling operation;
    an identifying part identifying a second range of the face in the second image on which the first scaling operation has been performed;
    a deciding part deciding a second reference point that is located in the second range, the second reference point being a center of gravity for the second range;
    a second calculating part that calculates a second scaling rate based on the second range and the second reference point; and
    a second scaling part that performs a second scaling operation on a third image, which is obtained after the second image, with the calculated second scaling rate and with the second reference point being a center for the second scaling operation.

3. The image processing system according to claim 2, wherein the second scaling part enlarges the second image.

4. The image processing system according to claim 2, wherein the first range of the face is a range of the face in a predetermined direction.

5. An image processing device, comprising:
    an image pickup part that obtains a plurality of image data by continuously accepting input of image data indicative of an image;
    an image processing part that detects a first range of a face in a first image data among the plurality of image data;
    a deciding part that decides a first reference point that is located in the detected first range, the first reference point being a center of gravity for the range;
    a first calculating part that calculates a first scaling rate based on the first range and the first reference point;
    a first scaling part that performs a first scaling operation on second image data, which is obtained after the first image data, with the calculated first scaling rate and with the first reference point being a center for the first scaling operation;
    an identifying part identifying a second range of the face in the second image data on which the first scaling operation has been performed;
    a deciding part deciding a second reference point that is located in the second range, the second reference point being a center of gravity for the second range;
    a second calculating part that calculates a second scaling rate based on the second range and the second reference point; and
    a second scaling part performing a second scaling operation on third image data, which is obtained after the second image data, with the calculated second scaling rate and with the second reference point being a center for the second scaling operation.

6. A non-transitory computer readable storage which stores a computer program that causes a computer to execute an image processing method comprising:
    obtaining a plurality of image data by accepting continuously input of image data indicative of an image;
    detecting a first range of a face in a first image data among the plurality of image data;
    deciding a first reference point that is located in the detected first range, the first reference point being a center of gravity for the range;
    calculating a first scaling rate based on the first range and the first reference point
    performing a first scaling operation on second image data, which is obtained after the first image data, with the calculated first scaling rate and with the first reference point being a center for the first scaling operation;
    identifying a second range of the face in the second image data on which the first scaling operation has been performed;
    deciding a second reference point that is located in the second range, the second reference point being a center of gravity for the second range;
    calculating a second scaling rate based on the second range and the second reference point; and
    performing a second scaling operation on third image data, which is obtained after the second image data, with the calculated second scaling rate and with the second reference point being a center for the second scaling operation.

* * * * *

UNITED STATES PATENT AND TRADEMARK OFFICE
CERTIFICATE OF CORRECTION

| | | |
|---|---|---|
| PATENT NO. | : 8,300,101 B2 | Page 1 of 1 |
| APPLICATION NO. | : 11/889990 | |
| DATED | : October 30, 2012 | |
| INVENTOR(S) | : Kozo Baba et al. | |

It is certified that error appears in the above-identified patent and that said Letters Patent is hereby corrected as shown below:

Column 12, Line 47, In Claim 6, delete "point" and insert -- point; --, therefor.

Signed and Sealed this
Twenty-second Day of January, 2013

David J. Kappos
*Director of the United States Patent and Trademark Office*